(12) United States Patent
Hamane

(10) Patent No.: US 11,204,009 B2
(45) Date of Patent: Dec. 21, 2021

(54) CONTROL METHOD FOR INTERNAL COMBUSTION ENGINE AND CONTROL DEVICE FOR INTERNAL COMBUSTION ENGINE

(71) Applicant: NISSAN MOTOR CO., LTD., Yokohama (JP)

(72) Inventor: Shouta Hamane, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/968,908

(22) PCT Filed: Feb. 15, 2018

(86) PCT No.: PCT/JP2018/005185
§ 371 (c)(1),
(2) Date: Aug. 11, 2020

(87) PCT Pub. No.: WO2019/159270
PCT Pub. Date: Aug. 22, 2019

(65) Prior Publication Data
US 2021/0047992 A1 Feb. 18, 2021

(51) Int. Cl.
*F02N 11/08* (2006.01)
*F02D 41/06* (2006.01)

(52) U.S. Cl.
CPC ........ *F02N 11/0818* (2013.01); *F02D 41/065* (2013.01); *F02N 11/0844* (2013.01);
(Continued)

(58) Field of Classification Search
CPC ................ F02D 41/065; F02D 41/009; F02D 2200/101; F02D 2200/021;
(Continued)

(56) References Cited

U.S. PATENT DOCUMENTS

2015/0107555 A1* 4/2015 Rai .................... F02N 11/0844
123/350
2016/0076472 A1 3/2016 Nakamoto et al.
(Continued)

FOREIGN PATENT DOCUMENTS

DE   10 2015 213 218 A1   1/2016
EP        2 881 565 A1     6/2015
(Continued)

*Primary Examiner* — George C Jin
(74) *Attorney, Agent, or Firm* — Foley & Lardner LLP

(57) ABSTRACT

If an internal combustion engine that has been automatically stopped is to be restarted under a decreased engine speed, a control unit of the internal combustion engine starts cranking when a crank angle of a cylinder in compression stroke of the internal combustion engine is closer to bottom dead center than a threshold value set in advance. More specifically, if an engine speed of the internal combustion engine is in forward rotation, the cranking is begun when the crank angle of the cylinder in compression stroke is closer to the bottom dead center than a threshold value set in advance. If the engine speed of the internal combustion engine is in backward rotation, the cranking is begun when the crank angle of the cylinder in compression stroke is closer to the bottom dead center than another threshold value set in advance.

6 Claims, 3 Drawing Sheets

(52) U.S. Cl.
CPC .. *F02D 2200/101* (2013.01); *F02N 2200/021* (2013.01); *F02N 2200/022* (2013.01)

(58) Field of Classification Search
CPC ......... F02N 2300/2011; F02N 2250/04; F02N 11/0818; F02N 11/0844; F02N 11/04
See application file for complete search history.

(56) References Cited

U.S. PATENT DOCUMENTS

| | | | |
|---|---|---|---|
| 2016/0312725 A1* | 10/2016 | Edington | F02D 41/0002 |
| 2018/0171915 A1* | 6/2018 | Suzuki | F02D 41/3005 |
| 2018/0230957 A1* | 8/2018 | Kamei | F02D 29/02 |

FOREIGN PATENT DOCUMENTS

| | | | |
|---|---|---|---|
| JP | 2014-122635 A | 7/2014 | |
| JP | 2014-218928 A | 11/2014 | |
| JP | 2015-108322 A | 6/2015 | |
| JP | 2016-98748 A | 5/2016 | |
| JP | 2016-194267 A | 11/2016 | |
| JP | 2018-3814 A | 1/2018 | |

* cited by examiner

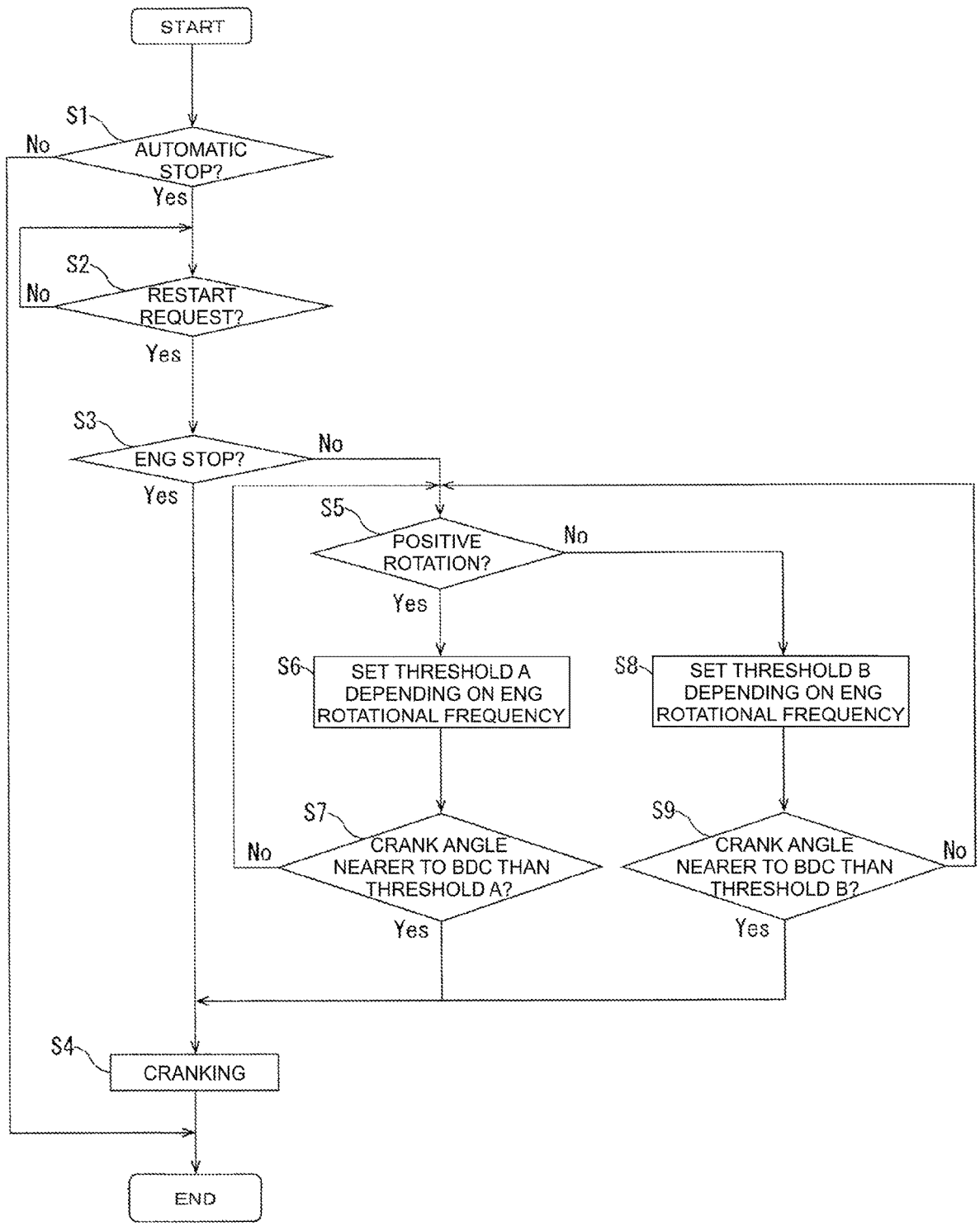

CONTROL METHOD FOR INTERNAL COMBUSTION ENGINE AND CONTROL DEVICE FOR INTERNAL COMBUSTION ENGINE

TECHNICAL FIELD

The present invention relates to a control method for internal combustion engine and a control device for internal combustion engine.

BACKGROUND ART

Patent Document 1 discloses art for restarting an engine in response to a brake-off performed during an automatic stop of the engine.

However, the restart may fail due to an insufficient torque of an electric motor upon cranking for automatic restart of the engine. For example, in case of a low voltage of a battery serving as a drive source of the electric motor, the electric motor generates a relatively low torque.

Thus, there is room for improvement in control for such engine automatic restart, in view of reliability of the engine restart.

PRIOR ART DOCUMENT(S)

Patent Document(s)

Patent Document 1: JP 2014-122635 A

SUMMARY OF THE INVENTION

According to one aspect of the present invention, upon restarting an internal combustion engine being in automatic stop, under a decreased engine speed, cranking of the internal combustion engine is started at a timing at which a crank angle of a cylinder in compression stroke of the internal combustion engine is nearer to bottom dead center than a predetermined threshold value.

This serves to boost the cranking by starting the cranking from the crank angle sufficiently near to the bottom dead center, and perform the cranking of the internal combustion engine over a reaction force against compression in the cylinder in compression stroke, even in case that an electric motor for the cranking generates a relatively small torque.

BRIEF DESCRIPTION OF THE DRAWINGS

FIG. 4 is a flow chart of the control on the internal combustion engine according to the present invention.

MODE(S) FOR CARRYING OUT THE INVENTION

The following details an embodiment of the present invention, with reference to the drawings.

Figure 1:
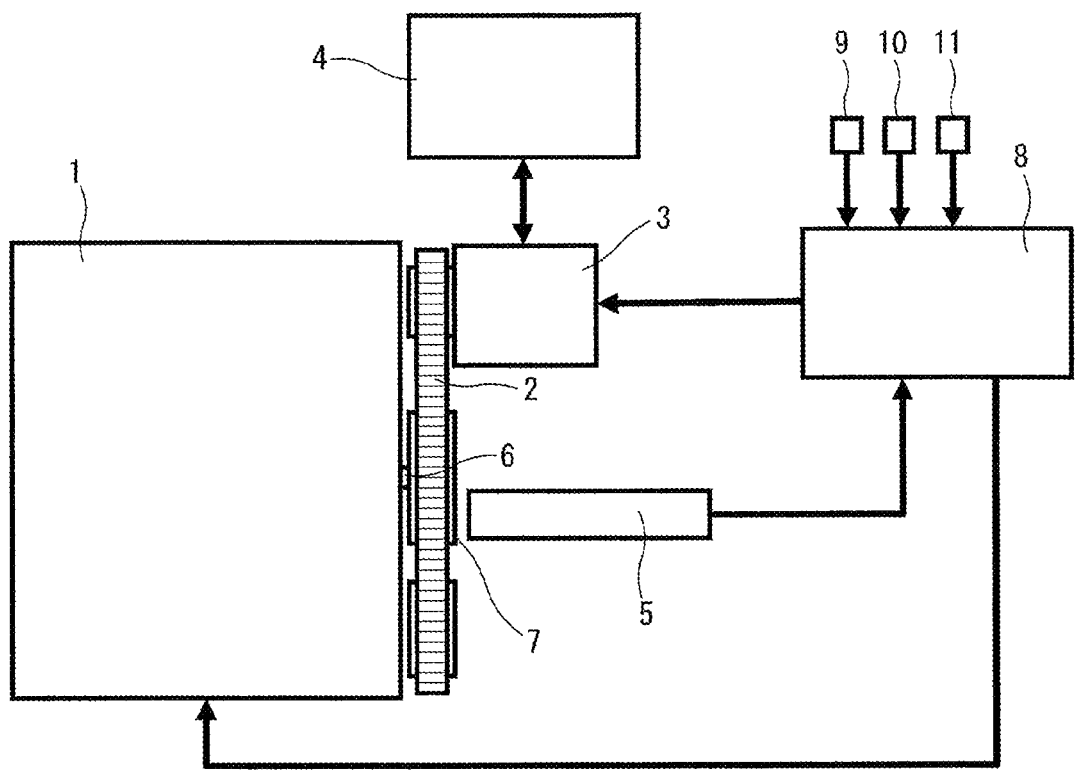
FIG. 1 is a schematic view of a control device for an internal combustion engine according to the present invention.

FIG. 1 is a schematic view illustrating a control device for an internal combustion engine 1 according to the present invention.

Internal combustion engine 1 serves as a drive source of a vehicle, and is structured to drive a motor generator 3 being an electric motor, via a belt 2. Internal combustion engine 1 includes a plurality of cylinders.

Motor generator 3 is structured to act as a motor (so-called power running) and also act as a generator (so-called regeneration).

Motor generator 3 serves as a so-called starter motor upon starting the internal combustion engine 1, employing an in-vehicle battery 4 as a drive source. Battery 4 is structured to be charged with electric power generated by motor generator 3.

Internal combustion engine 1 has an engine speed (i.e. an engine rotational frequency) and a crank angle which are monitored by a crank angle sensor 5. In detail, crank angle sensor 5 monitors a rotational speed (i.e. a rotational frequency) and a crank angle of a crankshaft 6 of internal combustion engine 1.

A reference numeral 7 in FIG. 1 represents a drive plate mounted to an end of crankshaft 6.

Internal combustion engine 1 is under control of a control unit 8. Control unit 8 is a known digital computer including a CPU, a ROM, a RAM, and an input/output interface.

Control unit 8 receives, in addition to a monitor signal from crank angle sensor 5 described above, monitor signals from various sensors such as an accelerator-opening sensor 9 monitoring a depression amount of an accelerator pedal not shown, a brake switch 10 monitoring an operation on a brake pedal not shown, and a vehicle speed sensor 11 monitoring a vehicle speed.

Based on the monitor signals from the various sensors, control unit 8 suitably controls an amount and timing of fuel injection from a fuel injection valve (not shown) of internal combustion engine 1, ignition timing and an intake air amount of internal combustion engine 1, etc. Furthermore, control unit 8 suitably controls motor generator 3.

Control unit 8 is configured to detect a cylinder being in a compression stroke, based on the monitor signals from crank angle sensor 5. Furthermore, control unit 8 is configured to measure a SOC (State Of Charge) that is a ratio of a residual capacity to a charging capacity of battery 4. Internal combustion engine 1 suspends fuel supply and automatically stops, in response to satisfaction of a predetermined automatic stop condition. Then, internal combustion engine 1 that has been in the automatic stop restarts in response to satisfaction of a predetermined automatic restart condition. In other words, control unit 8 determines that the restart is requested, in response to satisfaction of the automatic restart condition.

The automatic stop of internal combustion engine 1 may be divided into idle stop, coast stop, and sailing stop.

The idle stop is implemented in response to satisfaction of an idle-stop implementation condition during vehicle stop, wherein the idle-stop implementation condition serves as the automatic stop condition. Internal combustion engine 1 under the idle stop restarts in response to satisfaction of an idle-stop termination condition serving as the automatic restart condition.

The idle-stop implementation condition exemplarily includes: a requirement that the accelerator pedal is released; a requirement that the brake pedal is depressed; a requirement that the vehicle speed is less than or equal to a predetermined value; and a requirement that the battery SOC of the battery is greater than or equal to a predetermined threshold value for idle-stop prohibition. When all of such requirements are met, the idle-stop implementation condition is satisfied, and internal combustion engine 1 automatically stops.

In the present description, the requirement that the accelerator pedal is released means a requirement that the accelerator pedal is apart from a foot: i.e., the accelerator is OFF. Furthermore, the requirement that the brake pedal is depressed means a requirement that the brake switch 10 is ON.

The idle-stop termination condition during the vehicle stop exemplarily includes: a requirement that the accelerator pedal is depressed; a requirement that the brake pedal is released; and a requirement that the battery SOC is lower than the predetermined threshold value for idle-stop prohibition. When at least one of such requirements are met, the idle-stop termination condition is satisfied, and internal combustion engine 1 automatically restarts.

In the present description, the requirement that the accelerator pedal is depressed means a requirement that the accelerator is ON. Furthermore, the requirement that the brake pedal is released means a requirement that the brake pedal is apart from a foot: i.e., the brake switch 10 is OFF.

The coast stop is implemented in response to satisfaction of a coast-stop implementation condition during vehicle running, wherein the coast-stop implementation condition serves as the automatic stop condition. Internal combustion engine 1 under the coast stop restarts in response to satisfaction of a coast-stop termination condition serving as the automatic restart condition.

The coast-stop implementation condition is satisfied, for example, in a case that the battery SOC is greater than or equal to a predetermined value during deceleration with the brake pedal depressed.

The coast-stop termination condition is satisfied in response to, for example, the depression of accelerator pedal, or the release of brake pedal, or a need for securing electric power of the vehicle due to the battery SOC lower than or equal to a predetermined value.

The present embodiment refers to a coast stop state as a state that internal combustion engine 1 has automatically stopped during deceleration with the brake pedal depressed under a low vehicle speed.

The sailing stop is implemented in response to satisfaction of a sailing-stop implementation condition during vehicle running, wherein the sailing-stop implementation condition serves as the automatic stop condition. Internal combustion engine 1 under the sailing stop restarts in response to satisfaction of a sailing-stop termination condition serving as the automatic restart condition.

The sailing-stop implementation condition is satisfied, for example, in a case that during the vehicle running, the accelerator pedal turns to a released state from a depressed state, and the battery SOC is greater than or equal to a predetermined value.

The sailing-stop termination condition is satisfied, for example, in response to the depression of accelerator pedal, or in response to a need for securing the electric power of the vehicle due to the battery SOC lower than or equal to the predetermined value.

The present embodiment refers to a sailing stop state as a state that internal combustion engine 1 has automatically stopped during inertial traveling with the brake pedal released under a middle to high vehicle speed.

According to the present embodiment, control unit 8 serves as a controller configured to restart the internal combustion engine 1 being in the automatic stop, in response to satisfaction of the automatic restart condition. In addition, control unit 8 serves also to automatically stop the internal combustion engine 1 in response to satisfaction of the automatic stop condition.

In case that cranking is started under a decreased engine speed in internal combustion engine 1 that has suspended the fuel supply and automatically stopped, internal combustion engine 1 may be stationary due to equilibrium of torques at an engine speed of 0 rpm, when the crank angle reaches an angle of equilibrium with a reaction force against compression.

To avoid this, it is required to start the cranking of internal combustion engine 1 from a state that the cylinder in compression stroke is positioned sufficiently nearly to bottom dead center, in order to secure a sufficient engine speed. The sufficient engine speed serves to overcome the compression reaction force due to inertia (or momentum) thereof, even if the compression reaction force in the cylinder in compression stroke defeats a motor torque of motor generator 3 performing the cranking.

Motor generator 3 cranking the internal combustion engine 1 generates a torque (i.e. a drive torque) that gradually increases or rises with time after a timing of cranking start.

Accordingly, in case that internal combustion engine 1 that has automatically stopped restarts under a decreased engine speed, control unit 8 as the controller starts the cranking at a timing at which the crank angle of the cylinder in compression stroke of internal combustion engine 1 is nearer to the bottom dead center than a predetermined threshold value. In other words, in case that internal combustion engine 1 that has automatically stopped restarts before stop of rotation thereof, control unit 8 turns a cranking command ON and starts the cranking in response to satisfaction of a condition that the crank angle of the cylinder in compression stroke of internal combustion engine 1 is nearer to the bottom dead center than the predetermined threshold value.

In detail, in case that the engine speed is in positive rotation, internal combustion engine 1 starts the cranking at a timing at which the crank angle of the cylinder in compression stroke of internal combustion engine 1 is nearer to the bottom dead center than a predetermined threshold value A. In case that the engine speed is in reverse rotation, internal combustion engine 1 starts the cranking at a timing at which the crank angle of the cylinder in compression stroke of internal combustion engine 1 is nearer to the bottom dead center than a predetermined threshold value B.

Thus, the threshold value to be compared with the crank angle of the cylinder in compression stroke of internal combustion engine 1 is set depending on a rotation direction of internal combustion engine. In other words, the threshold value to be compared with the crank angle of the cylinder in compression stroke of internal combustion engine 1 is set to a different value depending on whether the rotation of internal combustion engine 1 rotates positively or reversely.

The positive rotation refers to a rotation direction of crankshaft 6 in a state in which drive force of internal combustion engine 1 is transferred to drive wheels of the vehicle. The reverse rotation refers to a rotation direction of swing back of crankshaft 6 which may occurs immediately before rotation of crankshaft 6 stops.

The above configurations serve to boost the cranking by starting the cranking from the crank angle sufficiently near to the bottom dead center, even in case that motor generator 3 generates a small torque due to a low voltage of battery 4. This allows motor generator 3 to perform the cranking over the compression reaction force of the cylinder in compression stroke, and restart the internal combustion engine 1.

Figure 2:
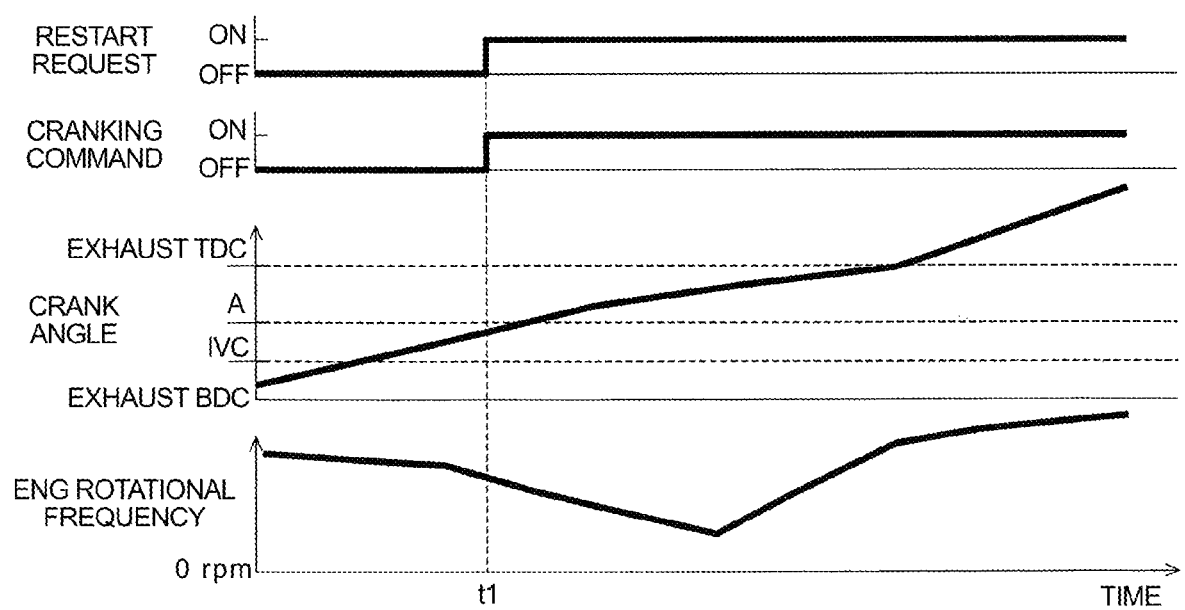
FIG. 2 is a timing chart showing an example of control on the internal combustion engine according to the present invention.

FIG. 2 is a timing chart showing an example of control for a case that internal combustion engine 1 that has automatically stopped restarts under the engine speed in positive rotation. The crank angle shown in FIG. 2 is a crank angle of the cylinder in compression stroke upon the request for restart.

According to the example of FIG. 2, the crank angle of the cylinder in compression stroke is lower than the predetermined threshold value A at a time instant t1 being a timing of satisfaction of the automatic restart condition and turning-ON of the restart request.

Thus, according to the example of FIG. 2, the cranking command is turned ON in order to start to drive the motor generator 3, at the time instant t1 at which the restart request is turned ON. In other words, according to the example of FIG. 2, the time instant t1 is a timing of starting the cranking of internal combustion engine 1 that has been in the automatic stop.

As shown in FIG. 2, the engine speed (shown as ENG rotational speed) starts to increase at a timing after the time instant t1, due to a time lag from the turning-ON of cranking command to start of the driving of motor generator 3.

In case that internal combustion engine 1 rotates at a high engine speed (i.e. a high rotational frequency) and in the positive rotation, the compression reaction force rises or increases quickly with respect to the rising or increasing in torque of motor generator 3.

This causes a balance of the torque of motor generator 3 (i.e. the drive torque) and the compression reaction force, i.e. a torque balance, to become negative, and thereby causes the engine speed (i.e. the engine rotational frequency) to continue falling. Then, the rotation becomes stationary if the engine speed falls into a vicinity of 0 rpm at a timing of equilibrium of the torque balance.

In case that internal combustion engine 1 rotates at a low engine speed (i.e. a low rotational frequency) and in the positive rotation, the compression reaction force rises or increases slowly with respect to the rising or increasing in torque of motor generator 3.

In this case, although the compression reaction force increases with advancement in crank angle so as to make negative the torque balance (i.e. the balance of the drive torque and the compression reaction force), the engine speed is suppressed from continuing falling because the engine speed can be increased during a period in which the torque balance is positive.

This allows the threshold value A in the positive rotation to be set to have a value that approaches the top dead center with decrease in engine speed. Thus, the threshold value A may be variably set depending on the engine speed.

Figure 3:
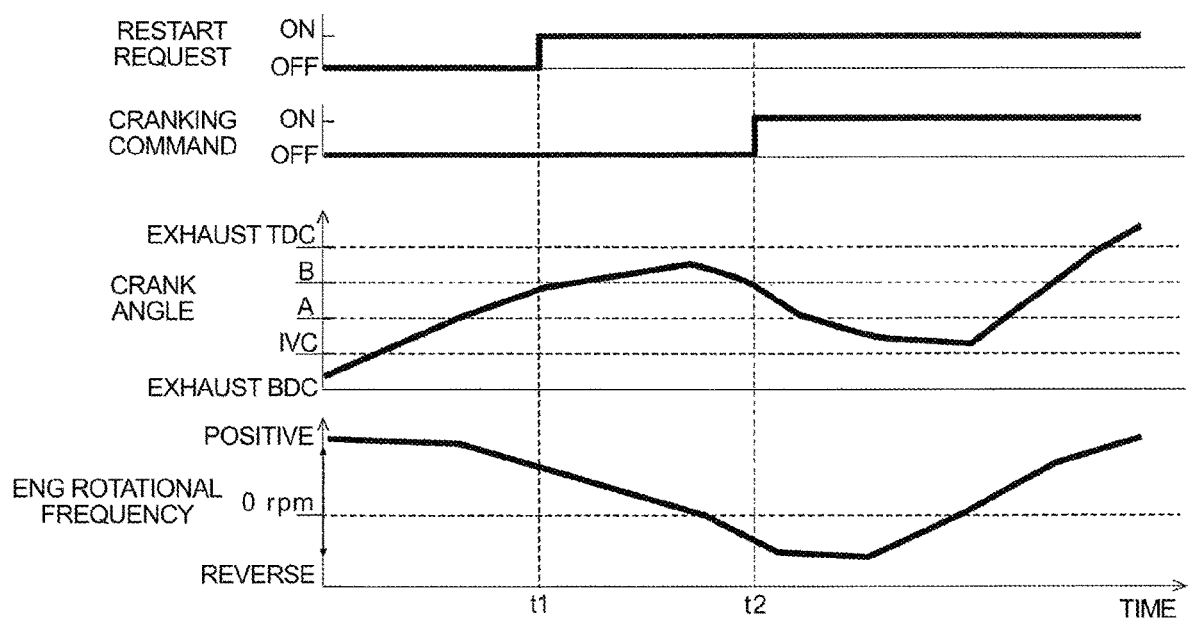
FIG. 3 is a timing chart showing an example of control on the internal combustion engine according to the present invention.

FIG. 3 is a timing chart showing an example of control for a case that internal combustion engine 1 that has automatically stopped restarts under the engine speed in reverse rotation. The crank angle shown in FIG. 3 is a crank angle of the cylinder in compression stroke upon the request for restart.

According to the example shown in FIG. 3, the automatic restart condition is satisfied at the time instant t1, and thereafter the crank angle of the cylinder in compression stroke is maintained greater than the threshold value A during a period in which the engine speed is in the positive rotation. Then, the crank angle of the cylinder in compression stroke falls below the threshold value B at a time instant t2 being a timing after the engine speed has turned into the reverse rotation. Thus, according to the example of FIG. 3, the cranking command is not turned ON at the time instant t1 at which the restart request is turned ON. The cranking command is turned ON at the time instant t2. In other words, according to the example of FIG. 3, the time instant t2 is a timing of starting the cranking of internal combustion engine 1 that has been in the automatic stop.

As shown in FIG. 3, the engine speed (shown as ENG rotational speed) starts to increase to a positive rotation side after the time instant t2, due to a time lag from the turning-ON of the cranking command to start of the driving of motor generator 3.

In case that internal combustion engine 1 rotates at a low engine speed and in the reverse rotation, the crank angle recedes slowly, and the compression reaction force falls slowly with respect to the rising in torque of motor generator 3. This reduces the advancement in crank angle toward the bottom dead center. Accordingly, motor generator 3 rises in torque antecedently to sufficient falling in compression reaction force. This causes the rotation to become stationary if the engine speed falls into the vicinity of 0 rpm at a timing of equilibrium of the torque balance that is the balance of the drive torque (i.e. the torque of motor generator 3) and the compression reaction force.

In case that internal combustion engine 1 rotates at a high engine speed and in the reverse rotation, the crank angle recedes quickly, and the compression reaction force falls quickly with respect to the rising in torque of motor generator 3. This amplifies swing back of the crank angle toward the bottom dead center. Accordingly, motor generator 3 rises in torque belatedly to sufficient falling in compression reaction force, and performs rise in engine speed. Although the compression reaction force increases with advancement in crank angle so as to make negative the torque balance (i.e. the balance of the drive torque and the compression reaction force), the engine speed is suppressed from continuing falling because the engine speed can be increased during a period in which the torque balance is positive.

This allows the threshold value B in the reverse rotation to be set to have a value that approaches the top dead center with increase in engine speed. Thus, the threshold value B may be variably set depending on the engine speed.

FIG. 4 is a flow chart showing a flow of control on the internal combustion engine according to the present invention.

Step S1 is determination of whether internal combustion engine 1 is in the automatic stop. If internal combustion engine 1 is in the automatic stop, step S2 is executed subsequently to step S1. If internal combustion engine 1 is not in the automatic stop, a routine at this time is ended.

Step S2 is determination of whether there is the restart request. If there is the restart request, step S3 is executed subsequently to step S2.

Step S3 is determination of whether internal combustion engine 1 is stationary: in detail, determination of whether the rotation of crankshaft 6 of internal combustion engine 1 is stationary. If internal combustion engine 1 is stationary, step S4 is executed subsequently to step S3. If internal combustion engine 1 is not stationary, step S5 is executed subsequently to step S3.

Step S4 is implementation, which means starting, of the cranking of internal combustion engine 1.

Step S5 is determination of whether internal combustion engine 1 is in the positive rotation. If crankshaft 6 of internal combustion engine 1 is in the positive rotation, step S6 is executed subsequently to step S5. If crankshaft 6 of internal combustion engine 1 is in the reverse rotation, step S8 is executed subsequently to step S5.

Step S6 is setting of the threshold value A depending on the engine speed (i.e. the ENG rotational speed).

Step S7 is determination of whether the crank angle of the cylinder in compression stroke is nearer to the bottom dead center than the threshold value A. If the crank angle of the cylinder in compression stroke is nearer to the bottom dead center than the threshold value A, step S4 is executed subsequently to step S7. If the crank angle of the cylinder in compression stroke is not nearer to the bottom dead center than the threshold value A, step S5 is executed subsequently to step S7.

Step S8 is setting of the threshold value B depending on the engine speed (i.e. the ENG rotational speed).

Step S9 is determination of whether the crank angle of the cylinder in compression stroke is nearer to the bottom dead center than the threshold value B. If the crank angle of the cylinder in compression stroke is nearer to the bottom dead center than the threshold value B, step S4 is executed subsequently to step S9. If the crank angle of the cylinder in compression stroke is not nearer to the bottom dead center than the threshold value B, step S5 is executed subsequently to step S9.

The above embodiment relates to a control method for internal combustion engine and a control device for internal combustion engine.

The invention claimed is:

1. A control method for an internal combustion engine structured to be a drive source of a vehicle, the control method comprising:
   upon restarting the internal combustion engine being in automatic stop, under a decreased engine speed,
   starting cranking of the internal combustion engine at a timing at which a crank angle of a cylinder in compression stroke of the internal combustion engine is nearer to a bottom dead center than a predetermined threshold value; and
   in response to the crank angle of the cylinder in compression stroke being nearer to a top dead center than the predetermined threshold value, delaying the start of the cranking until the crank angle of the cylinder in compression stroke becomes nearer to the bottom dead center than the predetermined threshold value.

2. The control method as claimed in claim 1, the control method further comprising:
   setting the predetermined threshold value to a different value depending on whether the internal combustion engine rotates positively or reversely.

3. The control method as claimed in claim 1, the control method further comprising:
   setting the predetermined threshold value to be variable depending on an engine speed of the internal combustion engine.

4. The control method as claimed in claim 1, wherein in response to the internal combustion engine rotating positively, the predetermined threshold value is set to have a value that approaches the top dead center with decrease in engine speed.

5. The control method as claimed in claim 1, wherein in response to the internal combustion engine rotating reversely, the predetermined threshold value is set to have a value that approaches the top dead center with increase in engine speed.

6. A control device for an internal combustion engine, the control device comprising:
   an internal combustion engine structured to be a drive source of a vehicle, and
   a control unit configured to restart the internal combustion engine being in automatic stop, in response to satisfaction of a predetermined automatic restart condition,
   wherein the control unit is configured to:
      start cranking of the internal combustion engine at a timing at which a crank angle of a cylinder in compression stroke of the internal combustion engine is nearer to a bottom dead center than a predetermined threshold value; and
      in case that the crank angle of the cylinder in compression stroke is nearer to a top dead center than the predetermined threshold value, delay the start of the cranking until the crank angle of the cylinder in compression stroke becomes nearer to the bottom dead center than the predetermined threshold value.

* * * * *